(12) United States Patent
Svoboda

(10) Patent No.: US 10,806,548 B2
(45) Date of Patent: *Oct. 20, 2020

(54) METHODS AND DEVICES FOR COUNTERING GINGIVAL EFFECTS IN DENTAL RESTORATION

(71) Applicant: CSD Connection Systems for Dentistry Inc., Brampton (CA)

(72) Inventor: Emil Svoboda, Brampton (CA)

(73) Assignee: CSD Connection Systems for Dentistry Inc., Brampton, Ontario (CA)

( * ) Notice: Subject to any disclaimer, the term of this patent is extended or adjusted under 35 U.S.C. 154(b) by 389 days.

This patent is subject to a terminal disclaimer.

(21) Appl. No.: 15/149,294

(22) Filed: May 9, 2016

(65) Prior Publication Data

US 2017/0020635 A1 Jan. 26, 2017

Related U.S. Application Data

(60) Provisional application No. 62/194,314, filed on Jul. 20, 2015.

(51) Int. Cl.
*A61C 8/00* (2006.01)

(52) U.S. Cl.
CPC ............ *A61C 8/0077* (2013.01); *A61C 8/006* (2013.01); *A61C 8/0009* (2013.01); *A61C 8/0022* (2013.01); *A61C 8/0068* (2013.01); *A61C 8/0078* (2013.01)

(58) Field of Classification Search
CPC .......................................... A61C 8/005–0078
See application file for complete search history.

(56) References Cited

U.S. PATENT DOCUMENTS

| 4,850,873 A | 7/1989 | Lazzara |
| 5,759,034 A | 6/1998 | Daftary |
| 6,048,203 A | 4/2000 | Rosenberg |

(Continued)

FOREIGN PATENT DOCUMENTS

| CA | 2611942 | 12/2006 |

OTHER PUBLICATIONS

International Search Report and Written Opinion relating to application No. PCT/CA2015/050467.

(Continued)

*Primary Examiner* — Heidi M Eide
*Assistant Examiner* — Drew S Folgmann
(74) *Attorney, Agent, or Firm* — Rowand LLP

(57) ABSTRACT

A dental restoration system including a dental prosthesis having an occlusal body having defined therein a cavity and having an outer profile; and a dental abutment having a main body with a gingival part for anchoring to an implant and an occlusal part shaped to fit within the cavity to support cementation of the dental prosthesis, wherein the occlusal part of the main body has an outer profile radially closer to the longitudinal center axis than an outer profile of the gingival part at the interface between the occlusal part and the gingival part, thereby defining a shoulder between the occlusal part and the gingival part. The radial width of the outer profile of the dental prosthesis where it meets the shoulder is the same as or smaller than the radial width of the outer profile of the gingival part at the shoulder.

14 Claims, 10 Drawing Sheets

(56) References Cited

U.S. PATENT DOCUMENTS

| | | |
|---|---|---|
| 6,648,645 B1 | 11/2003 | MacDougald et al. |
| 6,824,386 B2 | 11/2004 | Halldin |
| 6,939,135 B2 | 9/2005 | Sapian |
| 8,092,219 B2 | 1/2012 | Neumeyer |
| 8,371,851 B2 | 2/2013 | Smith et al. |
| 2003/0031981 A1* | 2/2003 | Holt ............... A61C 8/0018 433/173 |
| 2007/0037122 A1 | 2/2007 | Bassett |
| 2008/0014556 A1 | 1/2008 | Neumeyer |
| 2008/0057476 A1 | 3/2008 | Zettler et al. |
| 2008/0274440 A1 | 11/2008 | Smith |
| 2010/0068674 A1 | 3/2010 | Zucker |
| 2012/0077150 A1 | 3/2012 | Goodman et al. |
| 2012/0164602 A1 | 6/2012 | Lussi et al. |
| 2012/0308960 A1 | 12/2012 | Mashio et al. |
| 2014/0147812 A1 | 5/2014 | Ilter et al. |
| 2015/0017604 A1 | 1/2015 | Kern |

OTHER PUBLICATIONS

International Search Report and Written Opinion relating to application No. PCT/CA2016/050529.

\* cited by examiner

METHODS AND DEVICES FOR COUNTERING GINGIVAL EFFECTS IN DENTAL RESTORATION

CROSS-REFERENCE TO RELATED APPLICATIONS

The present application claims priority to U.S. provisional patent application No. 62/194,314, filed Jul. 20, 2015, the contents of which are hereby incorporated by reference.

FIELD

The present application generally relates to dental prostheses and, in particular, to dental implants or abutments to which dental prostheses are cemented.

BACKGROUND

Crowns and other dental prostheses are often attached to teeth or implants in the mouth by way of dental cement, i.e. a dental luting agent. A dental implant system for retaining a dental prosthesis typically has a threaded shaft for connection to the bone and an occlusal projection onto which the dental prostheses is to be cemented. In some cases the shaft is not threaded. The occlusal projection may be termed an abutment. In some cases, the occlusal part of the implant (the abutment) and the sub-gingival portion of dental implant that attaches to the jaw (upper or lower) are a unified piece. In some other cases, the dental implant system has two-parts: a dental implant to be secured to the jaw and an abutment to be later secured to the dental implant.

The prosthesis is cemented with a luting agent/dental cement to the abutment, whether it is an intermediary piece of a two-part implant system or whether it is part of a unified dental implant. The typical dental abutment or integrated implant system has an occlusal portion with a shoulder (sometimes termed the "margin"). The dental prosthesis is seated on the occlusal portion and abuts the shoulder. During attachment, cement between the dental prosthesis and the occlusal portion is compressed and extruded through the interface between the prosthesis and the shoulder. For partly cosmetic reasons, the typical dental abutment or implant may be seated such that the shoulder is just below the height of the gingiva so that the interface between the prosthesis and the abutment/implant is not visible. This can cause extruded cement to be injected below the gingiva, between the gingiva and the dental implant, which may lead to irritation and inflammation and even loss of the dental implant.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
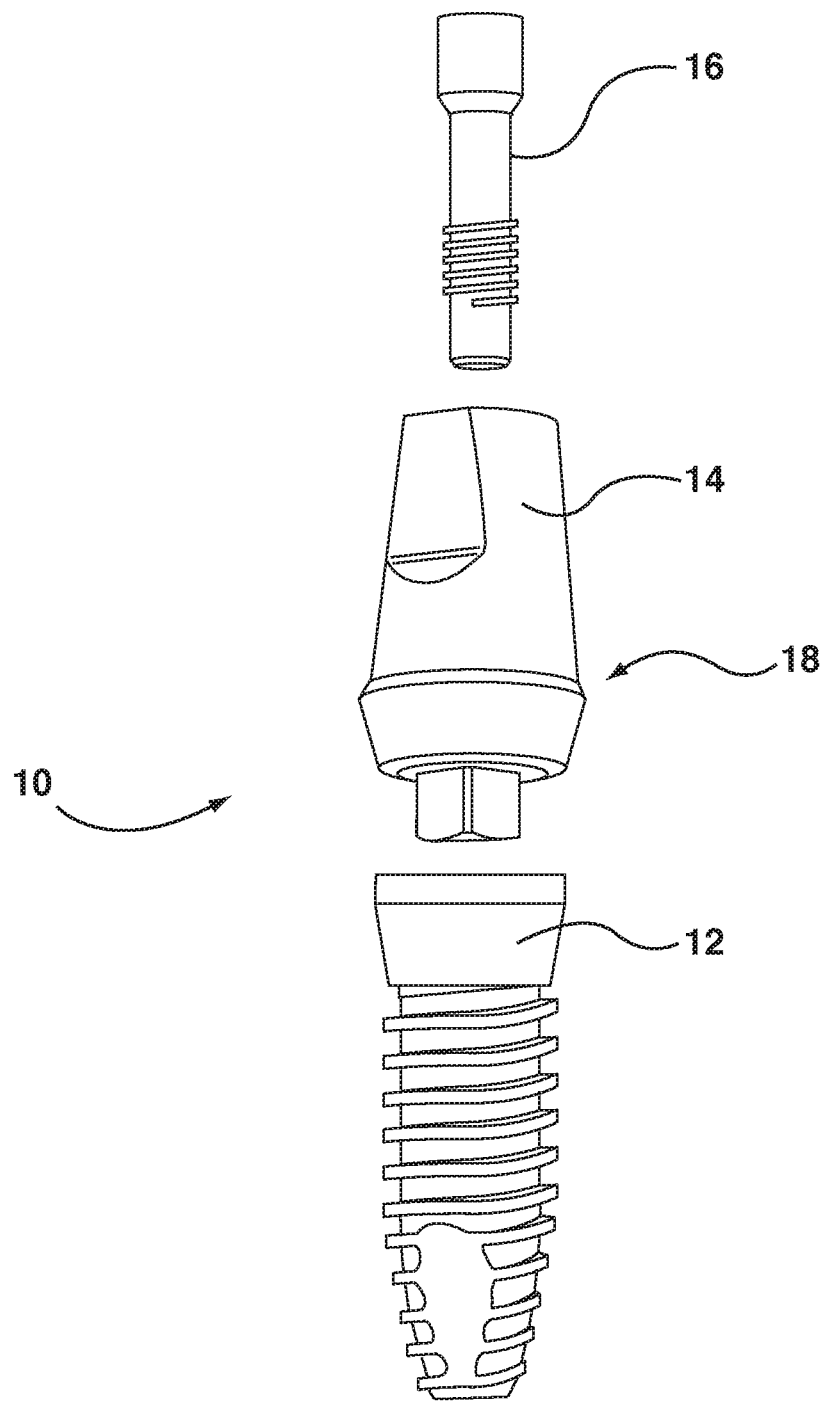
FIG. 1 shows a side view of an example of a dental implant, a dental abutment and a retaining screw.

In one aspect, the present application describes a dental restoration system. The system includes a dental prosthesis comprising an occlusal body having defined therein a cavity and having a outside profile; and a dental abutment having a main body with a gingival part for anchoring to bone and an occlusal part shaped to fit within the cavity to support cementation of the dental prosthesis. The occlusal part of the main body has an outer surface radially closer to a longitudinal center axis of the main body than an outer profile of the gingival part at the interface between the occlusal part and the gingival part, thereby defining a shoulder between the occlusal part and the gingival part. The cavity is shaped to enable the dental prosthesis to seat upon the shoulder when cemented, and wherein the radial width of the outside profile of the dental prosthesis where it meets the shoulder is smaller than the radial width of the outer profile of the gingival part at the shoulder.

In another aspect, the present application describes a dental abutment to be used in dental restoration with a dental prosthesis, the dental prosthesis having defined therein a cavity and having an outer profile. The dental abutment includes a main body having a gingival part for anchoring to bone and an occlusal part shaped to fit within the cavity to support cementation of the dental prosthesis. The occlusal part of the main body has an outer profile radially closer to a longitudinal center axis of the main body than an outer profile of the gingival part at the interface between the occlusal part and the gingival part, thereby defining a shoulder between the occlusal part and the gingival part. The cavity is shaped to enable the dental prosthesis to seat upon the shoulder when cemented, and wherein the radial width of the outer profile of the dental prosthesis where it meets the shoulder is smaller than the radial width of the outer profile of the gingival part at the shoulder.

In a further aspect, the present application describes a method to reduce residual sub-gingival cement during dental restoration. The method includes attaching an abutment to bone, wherein the abutment has a shoulder, and wherein at least a portion of the shoulder is located below a level of gingiva surrounding the abutment, the abutment having a radial width at an outer edge of the shoulder; providing a dental prosthesis for cementation to an occlusal end of the abutment, the dental prosthesis having a central cavity sized to fit upon the occlusal end of the abutment and having an outer radial width at a gingival end that is smaller than the radial width of the abutment at the outer edge of the shoulder; applying cement and affixing the dental prosthesis to the abutment; and removing excess cement extruded between the dental prosthesis and the abutment.

In another aspect, the present application describes a dental restoration system that includes a dental prosthesis having an occlusal body having an outer surface, and a dental abutment having a main body with a gingival part for anchoring to bone and an occlusal part to be cemented to the dental prosthesis, wherein the gingival part of the main body has an outer surface that meets the outer surface of the dental prosthesis at an interface. The system further includes a removable collar fit around the outer surface of the gingival part of the dental abutment.

In another aspect, the present application describes a dental prosthesis having a body with an outer surface, and having an occlusal end and a gingival end, and wherein the outer surface of the gingival end is radially narrower than the occlusal end, and wherein the outer surface has a concave surface at a level of the gingiva.

Aspects and features of the present application will be understood by those of ordinary skill in the art from a review of the following description of examples in conjunction with the accompanying figures.

In the description that follows, references will be made to dental restorations, i.e. prostheses, which will be understood to include crowns, bridges or other dental prosthetics typically cemented to a dental abutment or dental implant using a cement/luting agent. It will be appreciated that a dental abutment is generally a body onto which prosthesis mounted. The abutment is often a separate physical element from the dental implant since the implant is secured to a jawbone and the separate abutment allows for fine tuning of location/depth and, sometimes, angle of abutment such that the dental prosthesis ends up with correct location, orientation and support. The abutment may also be part of an integrated one-piece dental implant system. In such a case, references herein to the abutment will be understood as alternatively being applied to a separate abutment or to a dental implant system that incorporates an integrated abutment portion. References to a dental prosthetic or a dental restoration will be understood to be interchangeable terms and to include crowns, bridges, or other prosthetics intended to be attached to a dental implant system by way of a dental luting agent or dental cement.

The terms "cement", "dental cement", and "luting agent" are used interchangeably in the present application. In all instances, they are intended to refer to luting agents used to bind or cement two components together within the mouth and, in particular, to cementation compounds used to bind a dental prosthetic to an abutment.

The example implants, abutments and/or restorations depicted and discussed herein are shown in the figures, for consistency and ease of understanding, in the orientation used when mounting to the mandible (lower jaw); that is, with the biting/occlusal surface "up" and the attachment structure to be secured to the jaw or supporting tissues "down". It will be appreciated that implants and restorations may be used in the maxilla (upper jaw), in which case the biting/occlusal surface might be considered "down". To avoid confusion, the terms "up" or "upper" and "down" or "lower" are avoided in the present application since their meaning may depend on whether the applicable element is used in the maxilla or the mandible. The term "occlusal" refers to the biting surface and "gingival" refers to the attachment structure intended to be secured to the bone and/or gingiva or other supporting tissues.

Reference is first made to FIG. 1, which shows a perspective view of an example dental implant system 10. The dental implant system 10 is for tooth root replacement and to support a dental prosthesis (not shown). A typical dental implant system 10 includes a dental implant 12 and an abutment 14. This example dental implant 12 features a threaded shaft and a central bore. The abutment 14, in this example includes an axial passageway through which a screw 16 is inserted to secure the abutment 14 to the central bore of the dental implant 12. Mounted intraorally, the abutment 14 projects outwards from the gingiva and its occlusal part may be shaped as a (typically generally frustoconical) post onto which a prosthesis (not shown) may be mounted. The prosthesis may be attached to the abutment intraorally using a luting agent, such as dental cement. In other examples, the abutment 14 may not feature an axial passageway and may, instead, have an axial threaded shaft so that the abutment 14 is screwed into place on the dental implant 12. In yet other examples, the abutment 14 may be friction fit to the dental implant 12 or attached in some other way.

In the example shown in FIG. 1, the abutment 14 includes a shoulder 18 below the generally frustoconical post portion. The shoulder 18 serves to support and abut the cemented end of the prosthesis to give support to the prosthesis. The shoulder 18 may be referred to as the "margin" of the abutment 14. The terms shoulder and margin may be used interchangeably herein. The margin or shoulder generally describe the transition between the narrower occlusal part of the abutment 14 and the typically wider gingival part of the abutment 14.

Figure 2:
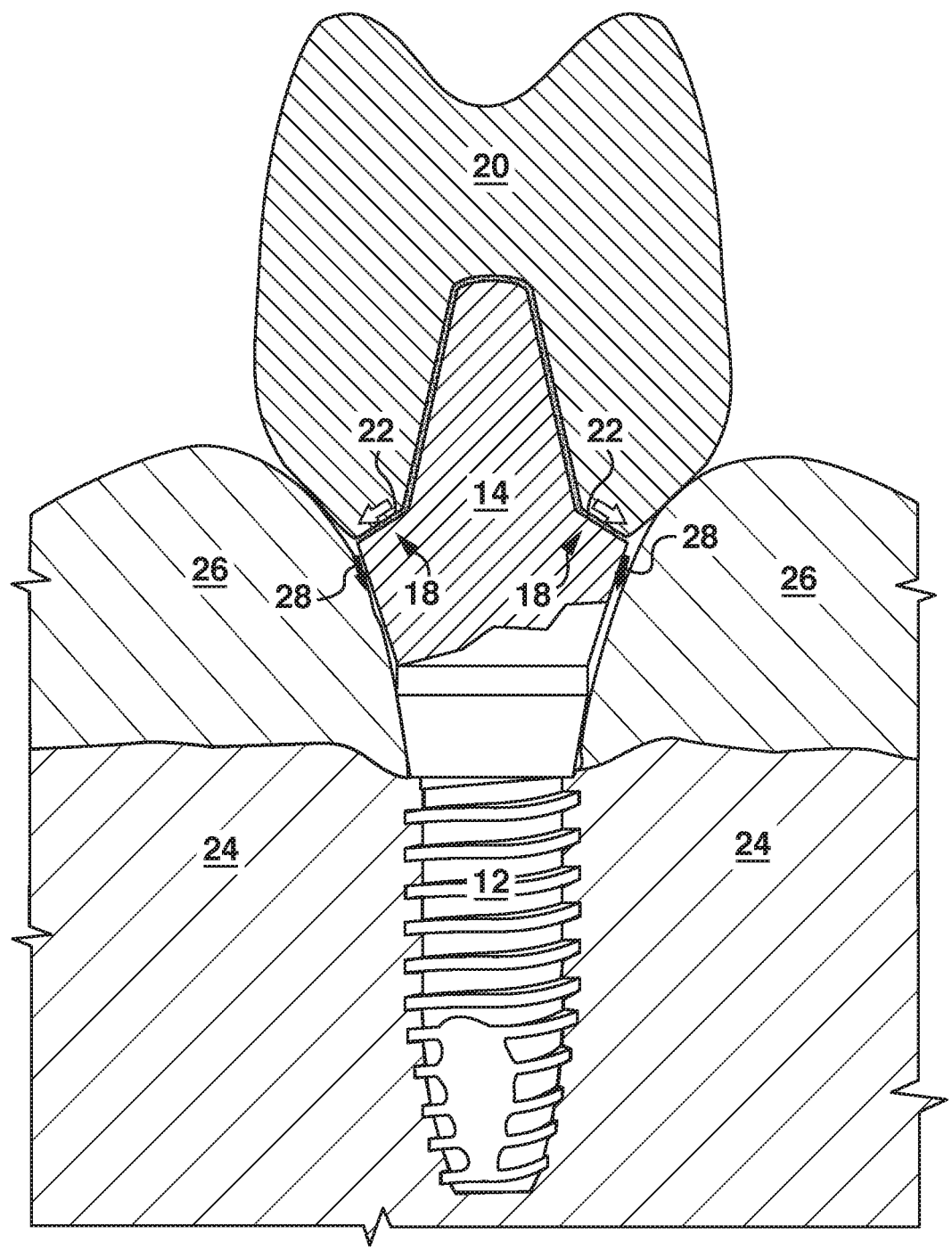
FIG. 2 shows a cross-sectional view of an implant and an abutment with a prosthesis.

Reference is now made to FIG. 2, which shows a cross-sectional view of the implant 12 and abutment 14 with a prosthesis, which in this example is a crown 20, mounted in the mouth of a patient. The implant 12 in this example is screwed into bone 24 in the jaw of the patient. Gingiva 26 (soft tissue) above the bone 24 surrounds the mounting location of the implant 12 and abutment 14. As shown in FIG. 2, the gingiva 26 has a raised portion surrounding a tooth location (or in this case a prosthetic tooth location). With a healthy tooth the gingiva 26 surrounds and seals around the tooth preventing food, microbes, etc., from getting below the gum line. With the crown 20, the gingiva 26 plays the same role, although less effectively, and will, in time, seal against the outer surface of the crown 20. With a crown 20, this seal may be expected to be less effective than with a healthy natural tooth in most cases.

The crown 20 is attached to the abutment 14 using a dental cement 22. The crown 20 has an interior profile generally shaped to correspond to the exterior profile of the end of the abutment 14 to which it is to be cemented. The dental cement 22 retains the crown 20 on the abutment 14 and, usually, eliminates or minimizes any gaps or spaces between the crown 20 and abutment 14 that could otherwise harbour microbes and cause inflammation of surrounding tissues. There is usually a cement space in the order of 20 to 120 microns, more or less, between the intaglio surface of the crown and the outer surface of the abutment and this cement space reduces to a minimum at the gingiva face of the abutment-crown interphase to minimize the cement line exposed to the tissues.

The exterior surface of the crown 20 is often shaped to have a profile that results in a smooth transition between the surface of the crown 20 and the outer surface of the gingival part of the abutment 14 where the shoulder 18 meets the outer surface, so as to avoid any discontinuities or visible transition lines. The abutment 14 is often formed from a metal such as titanium or titanium alloy, or a ceramic such as zirconium, or combinations thereof. For aesthetic reasons, the abutment 14 and crown 20 are often designed, particularly with modern custom abutments, such that the shoulder 18 is at or below the gingiva, at least for those crowns that would be visible to others once in place.

The shoulder 18 shown in FIGS. 1 and 2 slopes outwards and towards the gingiva 26 (i.e. away from the apex (occlusal surface) of the crown 20). When mounting the crown 20, the cement 22 is compressed and may be expelled from the interface between the crown 20 and the shoulder 18. With the shoulder 18 sloped towards the gingiva 26, it tends to eject cement into the gingiva 26, as indicated by arrows 28. To reduce subsequent leakage and visible discontinuities or gaps that may allow microbes to grow, the outer edge of the crown 20 profile is designed to meet the outer edge of the shoulder 18. The hydraulic pressure built up through compressing the cement while seating the crown 20 in place on the abutment 14 causes the cement to be expelled from the shoulder-crown interface at high velocity, projecting it downwards into or under the gingiva 26. In some cases, margins such as the "feather" or "knife-edge" margins are used. These margins result in cement being projected even more directly down into the gingiva during the intra-oral cementation process.

Cement injected under the gingiva 26 leads to irritation and possible infection of the gingiva 26 and the tissues of the jaw in general. In some cases, cement leads to inflammation of the gingiva 26 and bone 24 supporting the dental implant 12, and can lead to failure of the hard connection between the dental implant 12 and surrounding tissues.

Even with post-attachment cleaning, it can be extremely difficult to remove cement extruded from the interface between the crown 20 and the abutment 14, partly due to the difficulty in visibly observing and accessing the area after installation of the crown 20. Notably, the gingival attachment around a dental implant is different from that of a natural tooth. A healthy natural tooth has collagen fibers that hold the gums against the root surface, however these fibers do not exist around dental implants. Accordingly, the gums fit more loosely around dental implants, leaving a greater possibility for cement to be injected under the gingiva 26.

In US patent publication no. US 2016/0008105, a Reverse Margin™ abutment and crown are described. With such an abutment and crown, extruded cement is projected away from the gingiva, rather than into it. The contents of US patent publication no. US 2016/0008105 are hereby incorporated by reference.

It has been found that, at times, the gingiva play an important role in the excess cement problem. In particular, if the gingiva are loose around the abutment, then deflection of cement towards and under the gingiva finds an easier sub-gingival path. If the crown is oversized, i.e. it is wider than the abutment, then during mounting of the crown it may push against the gingiva creating a seal that traps excess cement and then causes it to be compressed and ejected deeper into the subgingival space. It may also push the gingiva away from the sides of the abutment, creating a space and thus a vacuum that sucks cement deeper into the subgingival space. These effects may be termed the "Plunger Effect" and the "Bellows Effect", respectively and they comprise part of the "Gingival Effects" that impacts cement movement during the intra-oral cementation process.

Figure 3:
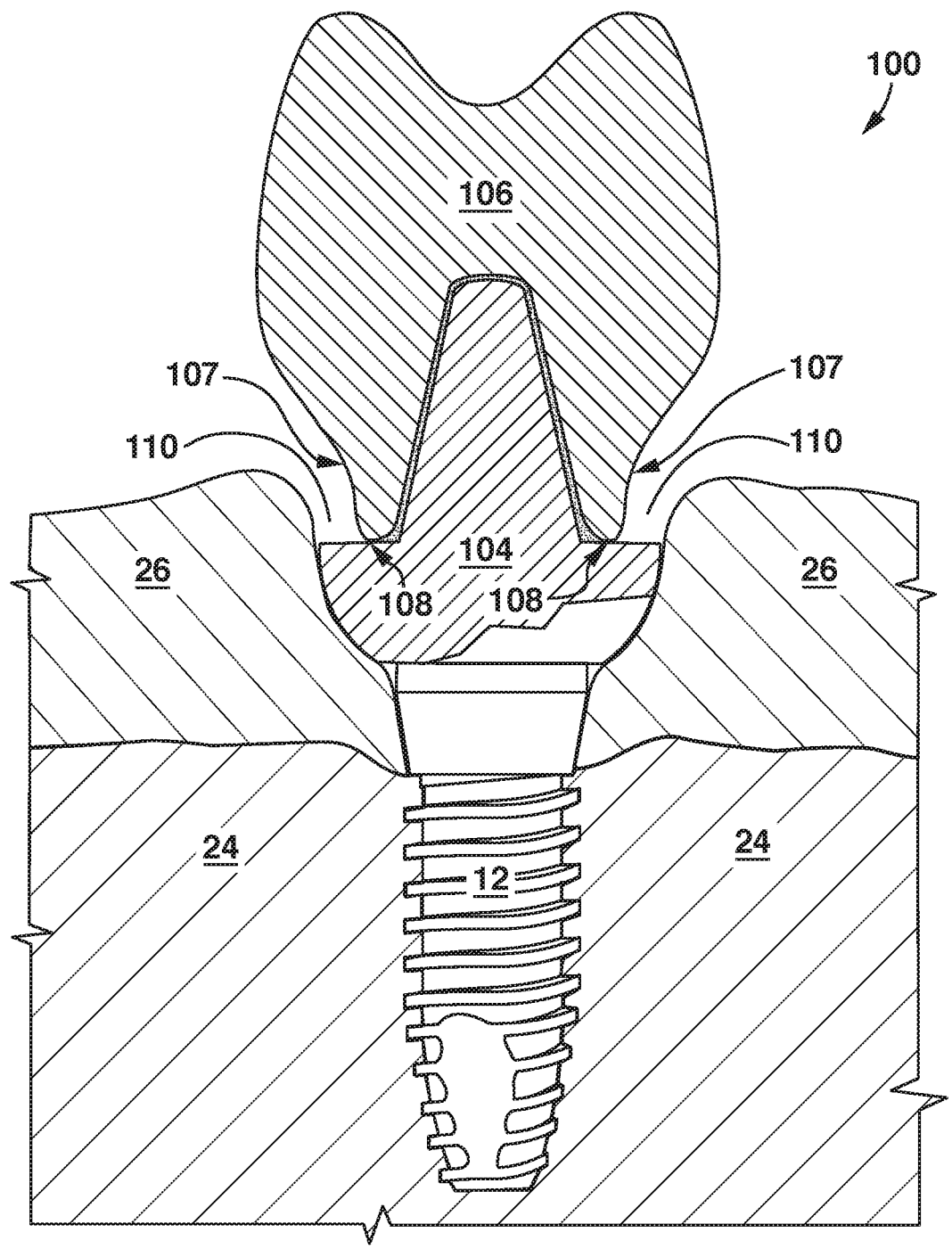
FIG. 3 shows a cross-sectional view of one example of an abutment and prosthesis according to the present application.

Reference is now made to FIG. 3, which shows a cross-sectional view of an example dental restoration system 100. The dental restoration system 100 in this example includes an implant 102 and abutment 104 with a prosthesis, which in this case is a crown 106. In this example illustration, the abutment 104 features relatively flat shoulder 108 extending radially. The gingival part of the abutment 104 is wider than the crown 106 where they meet at the shoulder 108, leaving a gap 110 between the gingiva and the sides of the crown 106. The wide gingival-contacting part of the abutment 104 pushes out the gingiva, thereby creating a better seal between the gingiva and the abutment 104, and leaving the gap 110 to enable easier escape of any excess cement extruded through the interface between the crown 106 and the abutment 104. This minimizes or eliminates the ability of the gingiva to trap cement between the crown and the gingiva and cause it to be injected into the subgingival environment, where it is difficult to locate and clean away.

It will be noted that the crown 106, in this embodiment, has a narrowed profile at its gingival end. That is, the radial width of the crown is concavely tapered inwards in the sub-gingival region 107 to assist in providing for the gap 110.

It will be appreciated that the size of the gap 110 in FIG. 3 is exaggerated for ease of illustration and explanation. In time the gingiva will tend to reseal against the side of the crown 106.

Figure 4:
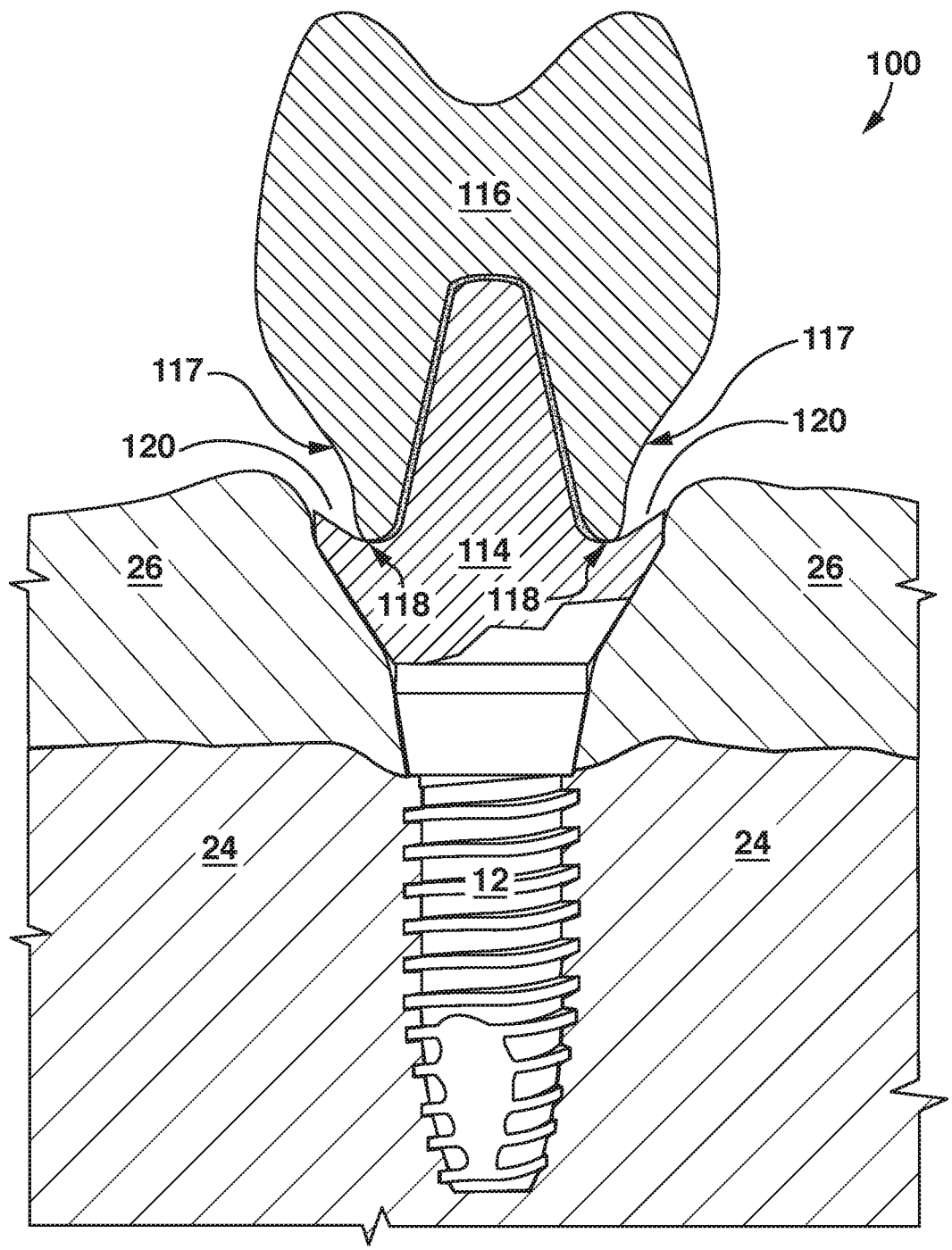
FIG. 4 shows a cross-sectional view of another example of an abutment and prosthesis.

FIG. 4 shows a cross-section view of another embodiment of the dental restoration system 100. The dental restoration system 100 in this example includes an abutment 114 and a crown 116, although in this example, the abutment 114 and the crown 116 feature a reverse margin. In other words, the abutment 114 in this example has a shoulder 118 that is sloped away from the gingiva. Proximate the shoulder 118, the crown 116 has a narrower diameter than the gingival end of the abutment 114, meaning the shoulder 118 extends radially beyond the interface point where the crown 116 meets the abutment 114, thereby creating a gap 120 between the gingiva and the outside profile of the crown 116.

In one embodiment, the gingival part of the abutment 114 may be "oversized" or flared outwards so as to stretch the gingiva, pushing the gingiva away from the crown 116. In another embodiment, the sides of the crown 116 may be formed to have an outside profile that does not exceed the width of the gingival part of the abutment 114 or an inwards taper that narrows the crown 116 towards its gingival end, or it may be shaved down after it has been formed to ensure the outside profile of the gingival end of the crown 116 is radially the same as or narrower than the gingival part of the abutment 114 at the widest portion of the shoulder 118. The shaved portion may be that portion of the crown 116 that would sit below the gingival line once the crown 116 is in place on the abutment 114. The prosthesis may be designed such that a narrowed portion 117 of the gingival end of the crown 116 sits below the level of the gingiva, and above the gingiva the crown 116 flares outwards to transition into the normal shape of the tooth it is replacing. This sub-gingival narrowed portion 117 may be slightly concave in profile to assist in creating the gap 120, thereby allowing cement to flow out of the subgingival space when subjected to hydraulic pressure as the crown 116 is mounted to the abutment 114.

Figure 5:
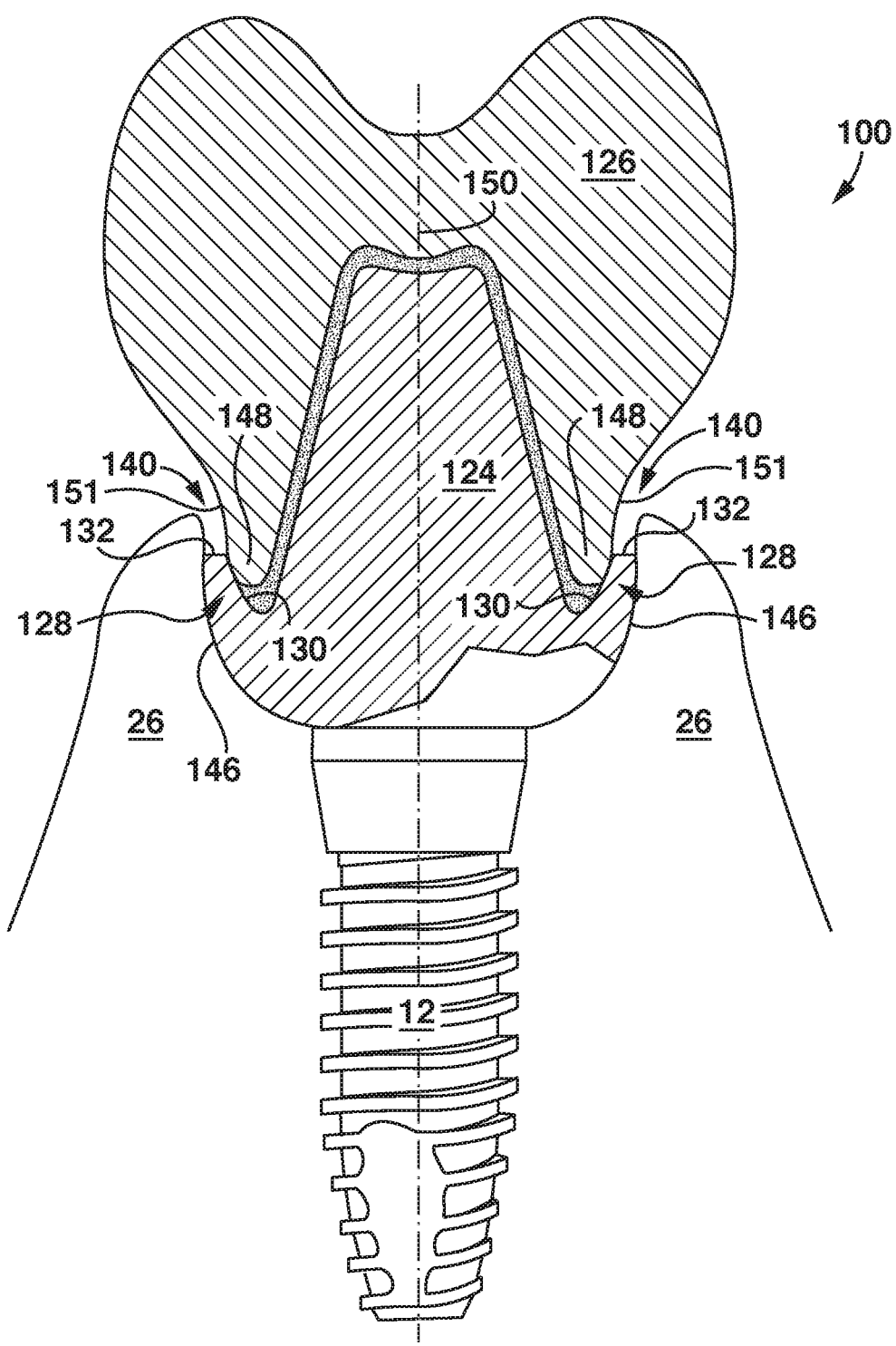
FIG. 5 shows a cross-sectional view of a further example of an abutment and prosthesis.

Another embodiment of the dental restoration system 100 is shown in cross-sectional view in FIG. 5. The dental restoration system 100 includes a crown 126 and an abutment 124. The abutment 124 in this example has a gingival part that has a convexly-curved outer profile 146. The gingival part of the abutment 124 is flared outwards such that proximate the shoulder 128, the abutment 124 is radially wider than a gingival end 148 of the crown 126. The flared gingival-contacting outer profile 146 of the abutment 124 serves to stretch the gingiva 26 and create a reliable seal to prevent ingress of cement.

The abutment 124 includes a shoulder 128 between outer profile 146 of the gingival part of the abutment 124 and the outer surface of the occlusal part of the abutment 124 to which the crown 126 is to be cemented. In this example, the shoulder 128 includes a concave portion 130 and a rim 132. The concave portion 130 smoothly transitions from the outer surface of the occlusal part of the abutment 124 so as to create an (at least partial) annular channel into which the gingival end of the crown 126 may fit. The face of the concave portion 130 at its most radially-spaced point, i.e. where it meets the rim 132, is at an acute angle with respect to a longitudinal axis 150 of the abutment 124. The outer profile of the gingival end 148 of the crown 126 makes contact with the radially-spaced face of the concave portion 130. The rim 132 may be substantially perpendicular to longitudinal axis 150, or at a slightly acute or obtuse angle. In some cases the rim 132 may not be flat. The rim 132 creates a gap 140 between the outer profile of the crown 126 and the gingiva.

When the crown 126 is mounted to the abutment 124, cement will be compressed between the crown 126 and abutment 124 and will be forced outwards at an acute angle between the outer profile of the crown 126 and the concave portion 130 of the shoulder 128, forcing it into the gap 140 and out above the gingiva 26.

The gingival end 148 of the crown 126, in this example, transitions form a normal crown profile to a narrowed radial profile 151 in the subgingival region so as to assist in creating the gap 140. The narrowed radial profile 151 may be at least partly concave.

Reference is now made to FIGS. 6A, 6B, 6C, and 6D, which illustrate a process for reducing residual sub-gingival cement during the process of intra-oral cementation. The process includes attaching an implant to bone at an implant site. In this embodiment, the implant is designed to have a custom abutment attached after installation of the implant; however, it will be appreciated that in some cases the implant and abutment may be integrally formed.

Figure 6D:
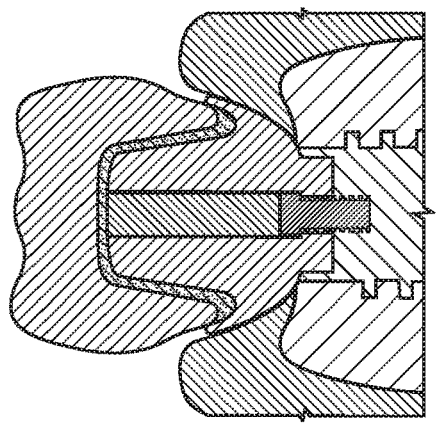
FIGS. 6A-6D illustrate a process of reducing sub-gingival cementation during a dental restoration procedure.
Figure 6C:
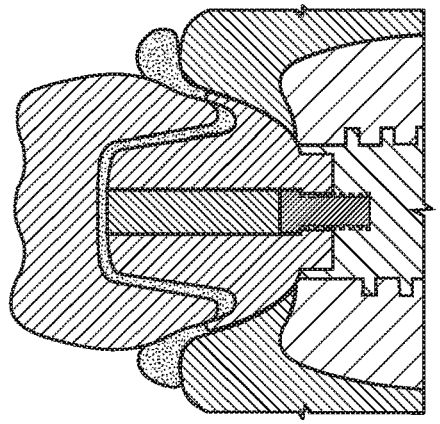
Figure 6B:
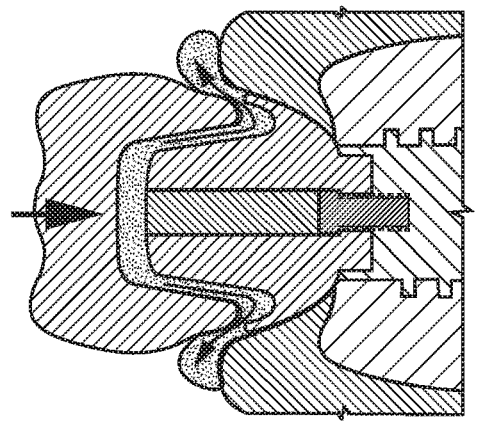
Figure 6A:
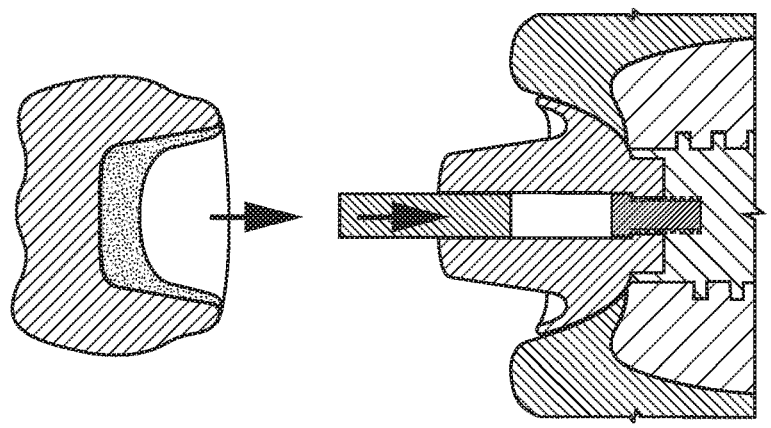

As shown in FIG. 6A, the abutment is attached to the implant using a central screw through a central bore in the abutment. In this example, after the abutment is secured in place, the central bore is filled with a packing material to prevent ingress of cement later. In this example, the packing material is Teflon™, but it may be other material in other implementations provided they are medically safe for use in the circumstances. As shown in FIG. 6A, the gingival part of the abutment is flared outwards so as to stretch the gingiva, and the abutment features a shoulder shaped as an annular channel into which the gingival end of the crown will fit.

Cement is applied between the abutment and the crown, and the crown is urged in place on the abutment, as shown in FIG. 6B. The pressure on the crown compresses the cement between the abutment and the crown, forcing some of the cement to be projected outwards into the gap between the gingiva and the outer profile of the crown, and from there above and atop the gingiva.

FIG. 6C illustrates the excess cement extruded into the gap and above the gingiva. The crown is shaped with a narrowed gingival end, so that it facilitates the flow of cement out of the tissue space. The excess cement is then removed from atop the gingiva and from the gap, as shown in FIG. 6D.

Figure 7A:
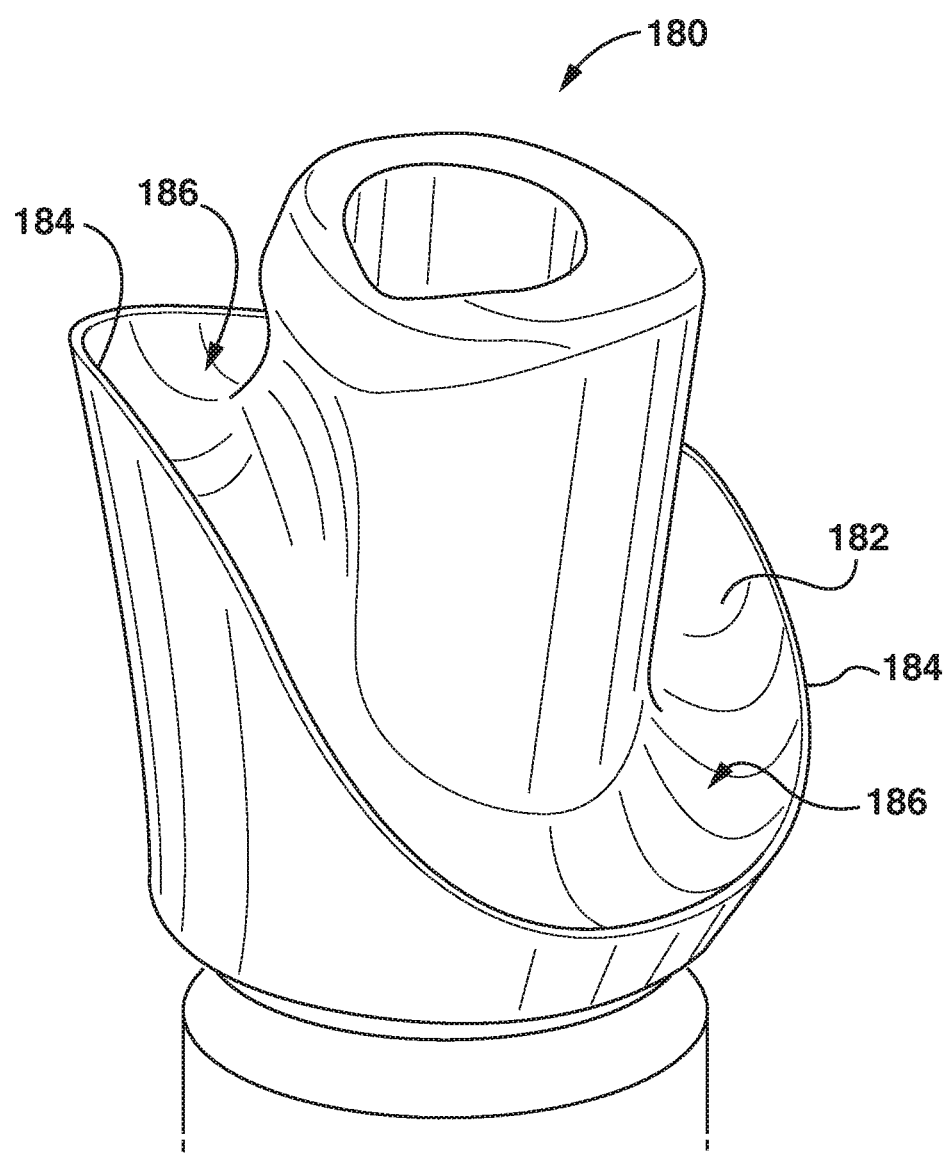
FIG. 7A shows a perspective view of an example custom abutment.
Figure 7B:
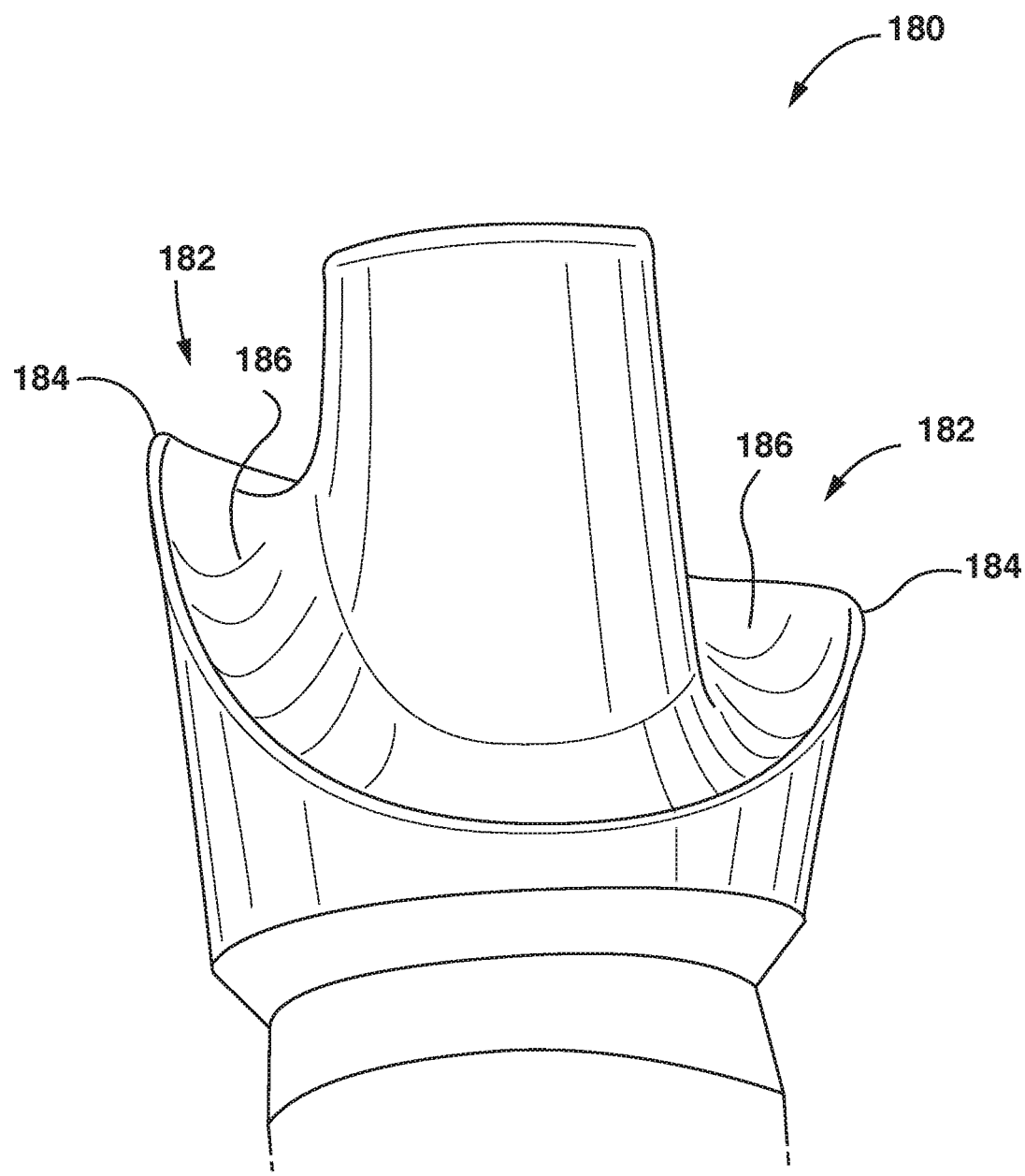
FIG. 7B shows a front view of the example custom abutment.

Reference is now made to FIGS. 7A and 7B. FIG. 7A shows an example of a custom abutment 180 in perspective view. FIG. 7B shows the custom abutment 180 in front view. In this example, it will be noted that the "margin height", that is, the axial shape of shoulder 182 is non-uniform. The shoulder 182 includes a rim 184 that is not circular, and it is not at a uniform axial position along the longitudinal axis. Instead, it is of varying axial position and radial distance. It will be understood that the shape of the gingiva around a tooth is not usually of a uniform depth. It is typically lower on the facial and lingual sides and taller on the mesial and distal sides. The gingival contour also varies with the type of tooth or implant it surrounds and from person to person. Accordingly, this custom abutment 180 has been milled for use with an example patient. The shoulder 182 includes a concave portion 186 that forms a non-uniform channel around the occlusal part of the abutment 180. In some embodiments, the non-uniform channel is generally annular, in that it is a non-uniform channel encircling the occlusal part of the abutment. In some embodiments, the channel is generally saddle-shaped.

It will be noted that the rim 184 in this example is relatively small. A thickness of between 0.1-0.5 mm may be suitable in some embodiments. The thickness depends, in part, upon the size of a gap desired for cement egress to avoid Gingival Effects, and, in part, upon the milling process and the material from which the abutment 180 is constructed. In some examples, the abutment 180 is formed from titanium, titanium alloy, or a titanium-zirconia hybrid. The latter (a hybrid titanium base with zirconium body) may be used to control grey coloration of the gingiva that may otherwise be seen with a solid titanium abutment in areas of esthetic concern.

Figure 8:
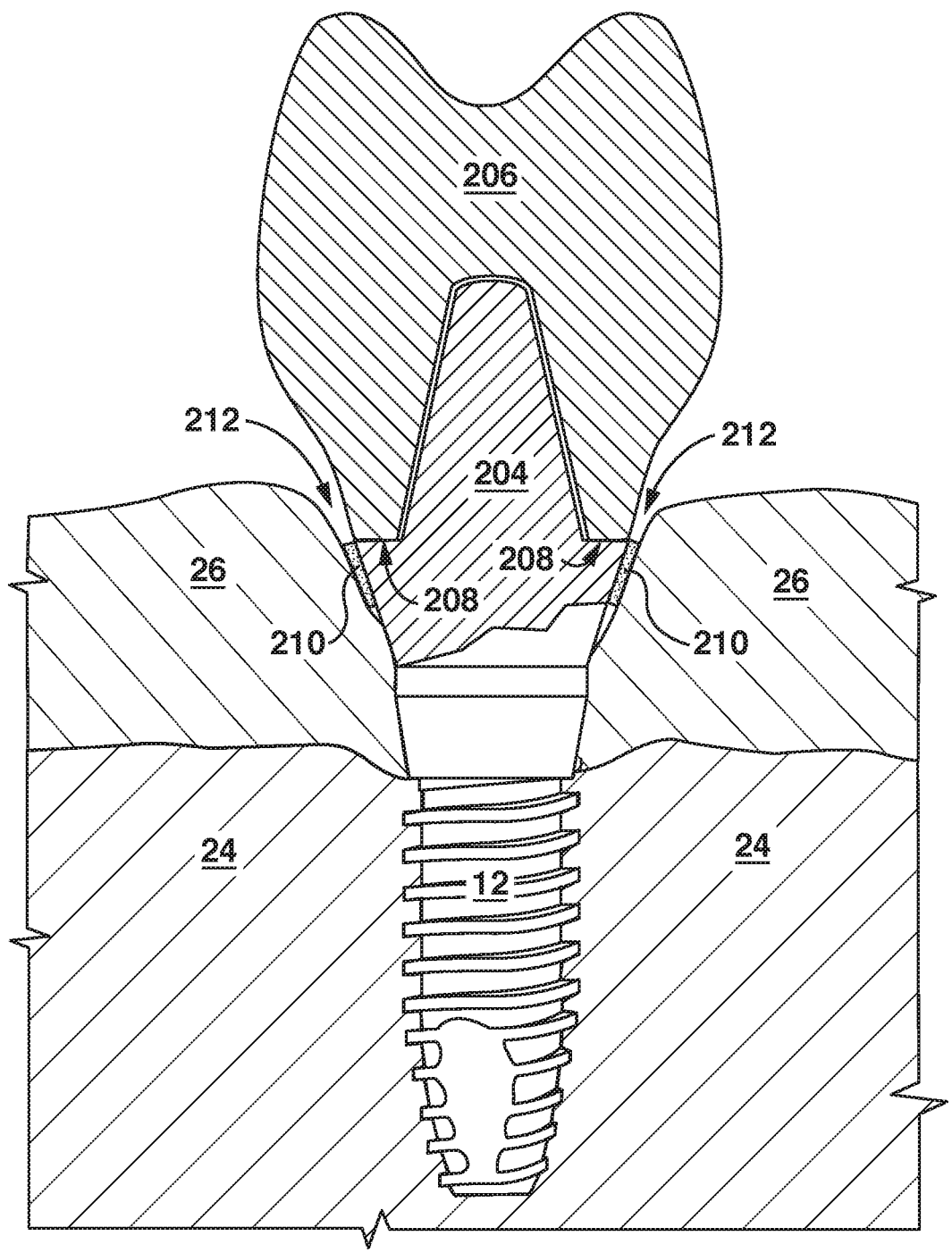
FIG. 8 shows a cross-sectional view of an example of an abutment and a prosthesis, with use of a removable collar.

Reference will now be made to FIG. 8, which shows a cross-sectional view of another example of an abutment 204 and crown 206. In this example, the abutment 204 is no wider than the crown 206 at its shoulder 208. The shoulder 208 of the abutment 204 is covered by the crown 206, such that the exterior side of the abutment 204 and the exterior side of the crown 206 meet at a common interface, avoiding discontinuities in the side profile (to the extent manageable given manufacturing tolerances).

In this embodiment, the abutment 204 has an associated collar 210. The collar 210 surrounds the abutment 204 and sits below the outer edge of the shoulder 208. When in place, the collar 210 stretches the gingiva and holds the gingiva away from the exterior surface of the crown 206 and, in particular, the interface point between the abutment 204 and the crown 206. This creates a gap 212 to allow excess cement extruded from the interface to escape out of the subgingival environment and also to permit easier access for removal of such cement by clinicians.

Figure 9:
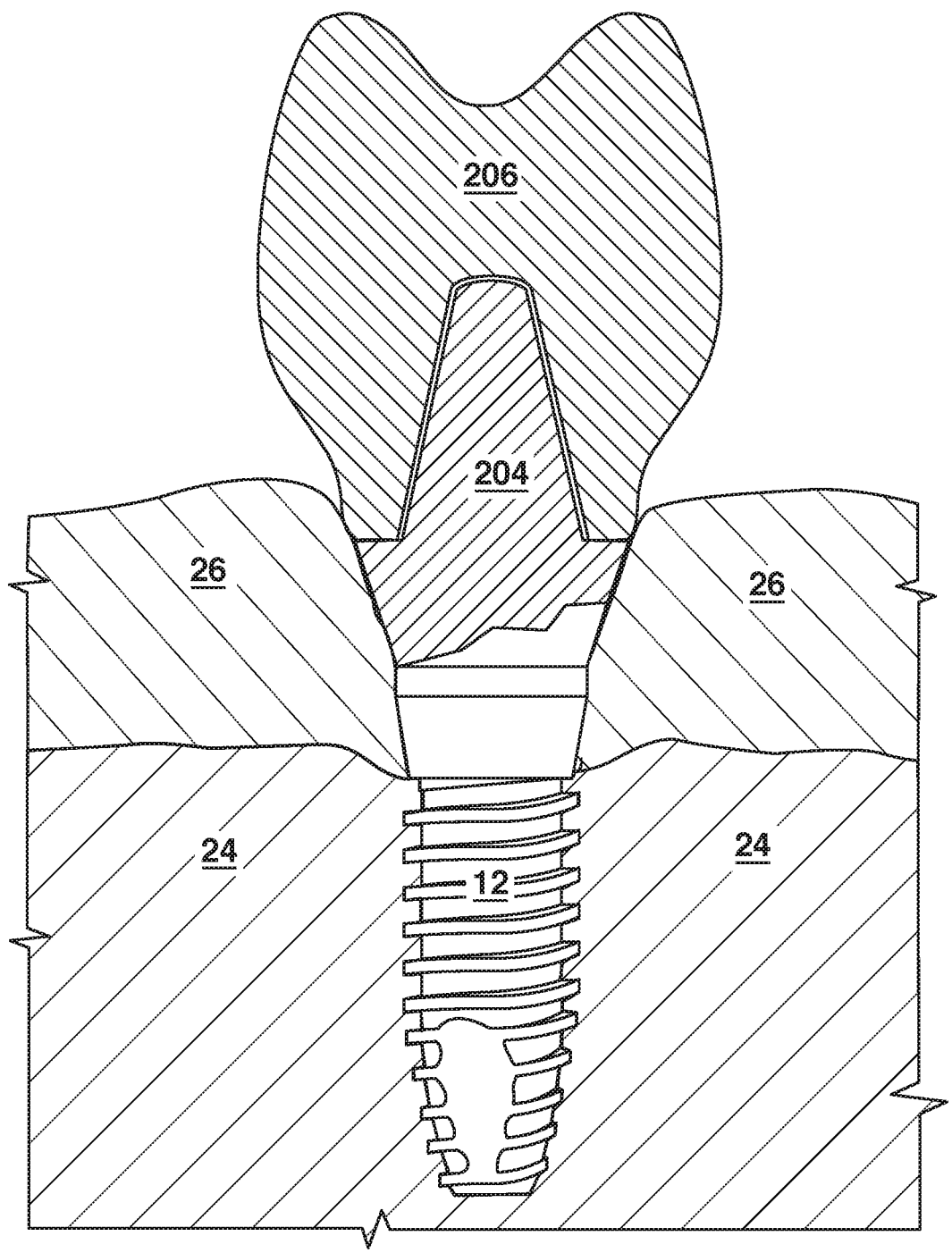
FIG. 9 shows the abutment and prosthesis of FIG. 8 with the collar removed.

The collar 210 is removable. That is, the collar 210 is intended to be in place during cementation of the crown 206 onto the abutment 204, but the collar 210 then removed to allow the gingiva to reseal against the exterior surface of the abutment 204 and the crown 206. FIG. 9 shows the abutment 204 and crown 206 with the collar 210 removed.

To facilitate remove of the collar, in some embodiments the collar 210 may feature one or more tabs extending up from the edge of the collar 210 to enable a clinician to grasp the tabs with pliers or tweezers in order to extract the collar 210 from around the abutment 204.

For ease of illustration, the collar 210 shown in FIG. 8 is of exaggerated thickness. In many embodiments, the collar 210 may be thinner than the one shown in the Figure. In some instances, the collar 210 may less than 1 mm thick. The thickness of the collar 210 may be related to the subgingival position of the margin (the interface between the abutment and prosthesis). If the margin is shallow, then a collar of 0.15 mm or less may be sufficient. If the margin is deeper, e.g. about 1 mm, then a thicker collar 210 may be advantageous so as to create a larger space and to account for the inward taper of the gingiva above the margin and top of the collar 210.

The collar 210 may made of a flexible material. Some examples include cloth, silk, Teflon™, plastic, collagen and metal. One example metal may be a titanium mesh. The collar 210 is formed of an inert material having sufficient thickness to temporarily push the gingiva away from the abutment, thus creating the space for cement to escape during intra-oral cementation.

The collar 210 may have an adhesive on the abutment-facing surface. The adhesive may be biocompatible and degradeable, such as is used in surgical sutures or collagen membranes.

In some embodiments, the collar 210 is formed from an absorptive material such that if cement were to come into contact with the collar 210 it would tend to become absorbed by the collar 210 and thus is removed when the collar 210 is removed.

The collar 210 may be sectioned, i.e. divided into parts, or detachable into parts, so as to facilitate removal of the collar 210 in pieces.

In some embodiments, the collar 210 may have a non-uniform thickness. In some embodiments, the collar 210 may be wedge-shaped such that it tapers inwards towards its bottom edge, and is at its thickest at its upper edge proximate the margin.

It will also be appreciated that the shape of the gingiva around a tooth is not usually of a uniform depth. It is typically lower on the facial and lingual and taller on the mesial and distal sides. The gingival contour also varies with the type of tooth or implant it surrounds and from person to person. The abutment for supporting a prosthesis is not typically round, but rather has a varied shape. Accordingly, in some embodiments the collar 210 may have a varied profile along its upper edge to match the profile of the margin. It may be bendable or mouldable to be made to fit the varied contours of the margin.

In one aspect, the present application proposes a packaged product including a custom abutment having a non-uniform margin profile and a corresponding custom collar having a corresponding non-uniform edge profile that matches the margin profile.

Certain adaptations and modifications of the described embodiments can be made. Therefore, the above discussed embodiments are considered to be illustrative and not restrictive.

What is claimed is:

1. A dental restoration system, comprising:
   a dental prosthesis comprising an occlusal body having defined therein a cavity having an inner surface, and having an outside profile, the inner surface meeting the outside profile at a gingival end of the dental prosthesis; and
   a dental abutment having a main body with a gingival part to be anchored to an implant and an occlusal part shaped to fit within the cavity to support intra-oral cementation of the dental prosthesis, wherein the occlusal part of the main body has an outer surface radially closer to a longitudinal center axis of the main body than an outer profile of the gingival part at the interface between the occlusal part and the gingival part, thereby defining a shoulder between the occlusal part and the gingival part, wherein the shoulder of the dental abutment includes a concave portion defining a channel into which the gingival end of the dental prosthesis is to fit, the concave portion including a face at an acute angle with respect to the longitudinal axis, and
   wherein the cavity is shaped to enable the gingival end of the dental prosthesis to nest within the channel such that the outside profile of the dental prosthesis contacts the face of the concave portion when cemented using dental cement, and wherein the radial width of the outside profile of the dental prosthesis where it meets the face of the concave portion is smaller than the radial width of the outer profile of the gingival part at the shoulder to define a gap between the outside profile of the dental prosthesis and the outer profile of the gingival part through which excess cement is to be extruded when mounting the dental prosthesis, while maintaining a space between the channel and the inner surface of the cavity near the gingival end in which the dental cement fills.

2. The dental restoration system of claim 1, wherein the shoulder further includes a rim between the concave portion and the outer profile of the gingival part of the dental abutment.

3. The dental restoration system of claim 2, wherein the thickness of the rim is between 0.1 mm and 0.5 mm.

4. The dental restoration system of claim 1, wherein the channel is generally annular.

5. The dental restoration system of claim 4, wherein the generally annular channel is non-uniform.

6. The dental restoration system of claim 4, wherein the generally annular channel encircles the occlusal part of the main body.

7. The dental restoration system of claim 1, wherein at least part of the outside profile of a subgingival portion of the dental prosthesis is concave to further define the gap.

8. The dental restoration system of claim 7, wherein the outer profile of the gingival part of the dental abutment is to stretch gingiva when the dental abutment is installed on the implant thereby ensuring the gap is provided between the outside profile of the dental prosthesis and the gingiva.

9. A dental abutment to be used in dental restoration with a dental prosthesis, the dental prosthesis having defined therein a cavity having an inner surface, and having an outer profile, the inner surface meeting the outer profile at a gingival end of the dental prosthesis, the dental abutment comprising: and
   a main body having
      a gingival part to be attached to an implant and
      an occlusal part shaped to fit within the cavity to support intra-oral cementation of the dental prosthesis,
      wherein the occlusal part of the main body has an outer profile radially closer to a longitudinal center axis of the main body than an outer profile of the gingival part at the interface between the occlusal part and the gingival part, thereby defining a shoulder between the occlusal part and the gingival part, wherein the shoulder of the dental abutment includes a concave portion defining a channel into which the gingival end of the dental prosthesis is to fit, the concave portion including a face at an acute angle with respect to the longitudinal axis,
      and wherein the cavity is shaped to enable the gingival end of the dental prosthesis to nest within the channel such that the outer profile of the dental prosthesis contacts the face of the concave portion when cemented using dental cement, and wherein the radial width of the outer profile of the dental prosthesis where it meets the face of the concave portion is smaller than the radial width of the outer profile of the gingival part at the shoulder to define a gap between the outside profile of the dental prosthesis and the outer profile of the gingival part through which excess cement is to be extruded when mounting the dental prosthesis, while maintaining a space between the channel and the inner surface of the cavity near the gingival end in which the dental cement fills.

10. The dental abutment of claim 9, wherein the shoulder further includes a rim between the concave portion and the outer profile of the gingival part of the dental abutment.

11. The dental abutment of claim 10, wherein the thickness of the rim is between 0.1 mm and 0.5 mm.

12. The dental abutment of claim 9, wherein the channel is generally annular.

13. The dental abutment of claim 12, wherein the generally annular channel is non-uniform.

14. The dental abutment of claim 12, wherein the generally annular channel encircles the occlusal part of the main body.

\* \* \* \* \*